United States Patent [19]
Palmer et al.

[11] Patent Number: 6,004,460
[45] Date of Patent: Dec. 21, 1999

[54] PORTABLE WATER FILTRATION BOTTLE

[75] Inventors: Carl W. Palmer; Michelle R. Palmer, both of San Clemente, Calif.

[73] Assignee: Seychelle Environmental Technology, Inc., San Clemente, Calif.

[21] Appl. No.: 09/044,280

[22] Filed: Mar. 19, 1998

[51] Int. Cl.[6] .................. B01D 27/04; B01D 27/08; C02F 1/28; C02F 1/50; C02F 9/00

[52] U.S. Cl. ............... 210/232; 210/238; 210/266; 210/282; 210/464; 210/466; 210/209; 210/501; 210/502.1; 210/510.1; 222/189.07; 222/189.09; 222/189.1

[58] Field of Search ....................... 210/266, 282, 210/510.1, 502.1, 504, 506, 464, 497.01, 238, 232, 466, 209, 501; 222/189.07, 189.09, 189.1

[56] References Cited

U.S. PATENT DOCUMENTS

| | | |
|---|---|---|
| 4,529,511 | 7/1985 | Breeden . |
| 5,061,367 | 10/1991 | Hatch . |
| 5,122,272 | 6/1992 | Iana et al. . |
| 5,273,649 | 12/1993 | Magnusson . |
| 5,545,315 | 8/1996 | Lenneman . |
| 5,609,759 | 3/1997 | Nohren, Jr. et al. . |
| 5,681,463 | 10/1997 | Shimizu . |
| 5,840,185 | 11/1998 | Hughes et al. . |
| 5,914,045 | 6/1999 | Palmer et al. . |
| 5,928,512 | 7/1999 | Hatch et al. . |

FOREIGN PATENT DOCUMENTS

96/3832  12/1996  WIPO .

Primary Examiner—Thomas M. Lithgow
Attorney, Agent, or Firm—James G. O'Neill

[57] ABSTRACT

A combination filter assembly and flexible, portable bottle having a bottom opening with a sealing cap attached thereto, to filter out substantially all INORGANICS, ORGANICS, RADIOLOGICAL CHEMICALS and MICROBIOLOGY held in water in the bottle. The filter assembly may be attached to an adapter sealed to the top of the flexible bottle. Water in the bottle passes through the filter assembly and out a top nozzle or valve when the flexible bottle is squeezed. The flexible bottle is filled with water through the bottom opening.

12 Claims, 2 Drawing Sheets

PORTABLE WATER FILTRATION BOTTLE

BACKGROUND OF THE INVENTION

1. Field of the Invention

This invention relates to water filtration, and more particularly, to an improved, portable water filtration bottle.

2. Description of Related Art

Water filtering means are widely known and used in numerous applications. It is important when comparing different kinds of filtration processes, and different kinds of products, that an understanding of the abilities and inabilities of each is obtained. The source of the water and particular "product need" are necessary to make sure that the correct filtration products are used in order to solve specific problems and to reduce specific contaminants and/or pollutants. With so many varying water problems and available filtration products throughout the world, an analysis or test of specific needs should be made before making a decision on what filtration product or products should be used to provide safe drinking water.

There are four (4) major types of water pollution, namely:

1) INORGANICS

Aesthetic—Taste, odor and clarity;

Wet Chemistry—Chlorine, turbidity and total suspended solids;

Heavy Metals—Aluminum, cadmium, chromium, copper, lead, etc.

2) ORGANICS

Industrial—VOLATILE ORGANIC COMPOUNDS (VOC),

Trihalomethanes (THM), etc.;

Agriculture—Organochlorine pesticides, PCB's, EBCP, and EDB.

3) RADIOLOGICAL CHEMICALS

Radon 222.

4) MICROBIOLOGY

Coliform, Fecal Coliform, R. Terrigene, Cryptosporidium, Giardia L.

Each filtration and/or purification process and/or product has different abilities and inabilities of removing the contaminants mentioned above. These include: 1) Sediment filtration, which is primarily used to remove silt, sand and suspended items. Sediment filters come in many sizes, such as 20 micron, to remove particles that are 20 microns in size or larger. 2) Granulated activated carbon filtration (GAC), which are very effective at removing some chlorine, chloroform, trihalomethane, VOC, pesticides, herbicides and other organic chemicals. This type of filter is responsible for improving clarity, taste and odor, and the characteristics of the quality or type of GAC—dwell time, volume and flow rate have to be considered to create the best results for absorption of pollutants in water. The present invention uses a filter having Powder Activated Coconut Carbon (PAC), which is considered to be the very highest quality and smallest of the carbon medias. 3) Ultrafiltration, which is the design of very fine filters or ultrafiltration filters created for use in removing the contaminants listed above. These filters have the ability to remove pathogens that are larger than the pore size of the fine filter. Giardia, Cryptosporidium and other micro-organisms measuring 2–10 microns in size. Such filter assemblies are set forth in pending application Ser. No. 08/813,268, filed Dec. 23, 1996 for a PORTABLE FILTRATION SYSTEM AND METHOD, naming the same inventors as the current application. The disclosure of this application is incorporated herein, in its entirely, by this reference thereto. These known filters can remove up to 99.9% of the pollutants. Although such known water filter assemblies solve the above-mentioned filter needs, it has been found that the handling of the caps of such filters, when removing or replacing them on a bottle can contaminate the filter. Thus, there still exists the need in the art for an easy-to-use, substantially low-cost filter held in a flexible bottle that is not contaminated by handling, and efficiently filters and purifies water.

The combination filter and squeeze bottle of the present invention provides a product that has similar capabilities to known filter bottles to improve filtration and purification for more of the total pollution, by providing a water filter purification system, using media that is smaller than 5 micron in pore size, sealed in the interior of a bottle. The present invention has been specifically designed to be effective in all of the pollution areas identified above, namely, INORGANICS, ORGANICS, RADIOLOGICAL CHEMICALS AND MICROBIOLOGY. Available testing data shows the improved abilities of the present invention to remove high percentages of all of these contaminants or pollutants, without becoming contaminated by handling, which might occur with known systems.

Basically, the filter bottle combination of the present invention is permanently mounted and sealed in the top of a flexible, portable bottle. The flexible bottle includes an opening in the bottom of the bottle through which water may be added. A sealing cap is used to close the bottom opening. The filter assembly permanently secured in the bottle includes a PAC filter impregnated with sorbent media and a check valve assembly with a further filter mounted therein. When the cap closure at the bottom of the bottle is removed from the flexible bottle, the flexible bottle is filled with questionable water and the bottom cap replaced and tightened to seal the bottle. A nozzle outlet or valve is provided at a tip portion at the top of the bottle, after the sealed filter element. This valve may then be pulled upwardly or turned to open, and the flexible bottle squeezed to force water through the filter element, permanently sealed in the top of the bottle, whereby clean, filtered water will exit through the open nozzle or valve. The nozzle outlet or valve is then closed to seal the unit after use.

SUMMARY OF THE INVENTION

Accordingly, it is a general object of the present invention to provide an improved portable squeeze bottle and filter assembly. It is a particular object of the present invention to provide a compact PAC water filter permanently secured in the top of a flexible, portable bottle. It is yet a more particular object of the present invention to provide an improved filter assembly permanently secured in the top of a flexible, portable bottle, having an opening in the bottom of the bottle. It is a still further particular object of the present invention to provide an improved flexible, portable bottle having an improved filter assembly permanently secured in the top thereof. And, it is yet a still more particular object of the present invention to provide an improved, flexible, portable bottle having an improved filter element secured in a top of the bottle, with an open bottom, having a closure cap thereon.

In accordance with one aspect of the present invention, there is provided a filter assembly for a flexible, portable bottle. The filter assembly includes a PAC filter assembly permanently secured in the top of the flexible body of the bottle to filter out substantially all pollutants. The bottle has an opening formed in the bottom of the flexible body of the bottle to allow water to be added to the flexible bottle. The present invention also provides a novel bottom cap for sealing the flexible, portable bottle to allow water in the bottle to be squeezed out through a nozzle or valve in the top of the bottle, when the nozzle is open and sufficient force is applied to the bottle.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DETAILED DESCRIPTION OF THE PREFERRED EMBODIMENT

Figure 1:
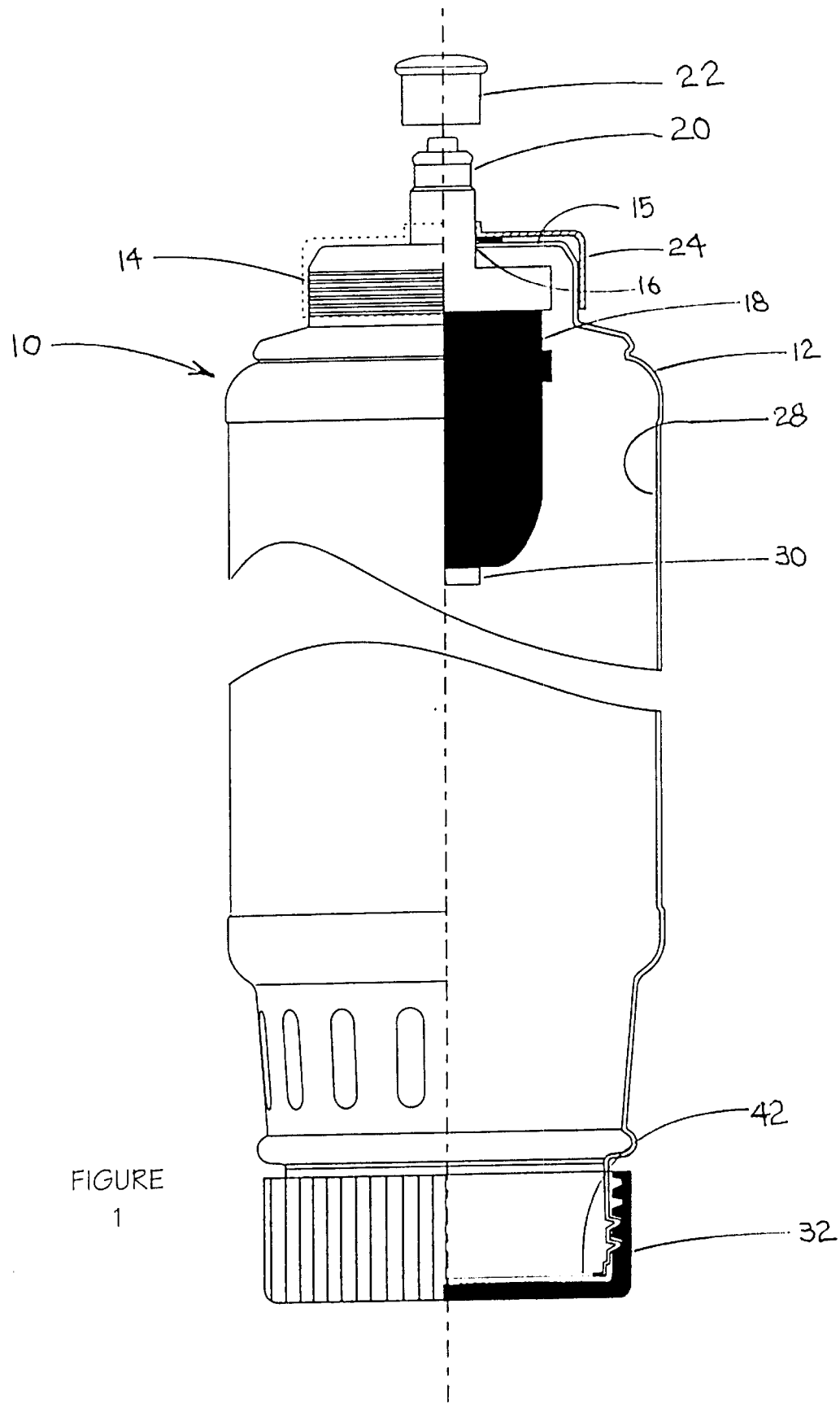
FIG. 1 is a partial cross-sectional view of a preferred embodiment of a flexible, portable bottle, filter assembly and bottom fill cap of the present invention.

The following description is provided to enable any person skilled in the art to make and use the invention, and sets forth the best modes contemplated by the inventors of carrying out their invention. Various modification, however, will remain readily apparent to those skilled in the art, since the generic principles of the present invention have been defined herein, specifically to provide for an improved combination water filter assembly and portable squeeze bottle 10.

Turning now to the drawings, there shown is a portable bottle and filter 10, having a flexible body 12, made from polyethylene, PVC, PET, or polypropylene. The body 12 includes a narrowed neck or top portion 14 having a flat top 15 with an opening 16 therein. A filter 18 is permanently secured in this reduced neck portion against flat top 15, in alignment with opening 16, in a water-tight/air-tight manner, as by being glued or otherwise permanently held in an adapter 20, permanently secured in the top portion against flat top 15, and having an elongated neck portion extending therethrough, ending in a nipple or the like, having a nozzle or valve 22 thereon. A cosmetic cover 24 is slid down over the valve 22 and nipple end of the adapter 20, and permanently secured to the top of the bottle 12, as by bonding, gluing, sonic welding, or the like.

Figure 2:
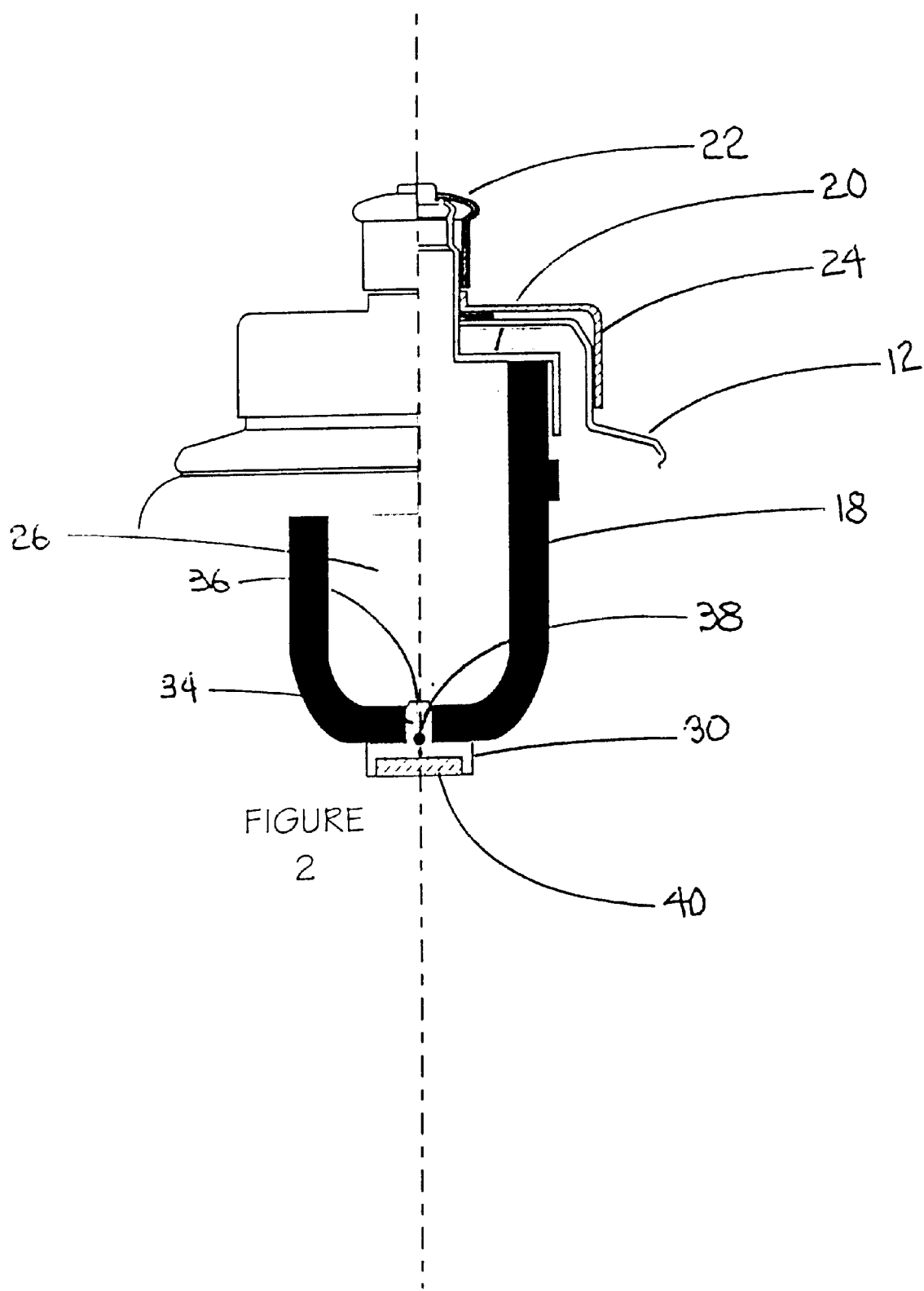
FIG. 2 is a cross-sectional view of the filter assembly permanently secured in the top of the bottle.

The filter 18 is preferably formed as disclosed in pending application Ser. No. 08/813,268, from a one piece cylindrical element having an open central chamber 26 (see FIG. 2). The cylindrical element is preferably molded so as to have a porosity of from 2 to 8 microns, from a porous plastic material having a granulated powder, such as Coconut PAC, and impregnated with a further sorbent media designed to reduce water contamination—pollutants greater than 90%. If desired, the exterior of the cylindrical filter element 16 may have a membrane or an Iodide/Anion Resin coated thereon. The contaminants—pollutants removed by this filter element 18 are those four types described above.

As described above, the upper end of the cylindrical filter 18 is permanently secured in the interior 28 of the bottle, at the top, in an adapter 20, so that the open central chamber 26 is fluidly connected to the opening 16 passing through the flat top 15 and connected to the nozzle outlet or valve means 22. The nozzle outlet or valve means 22 is opened and closed by sliding or rotating, in a manner well known to those skilled in the art.

The other or lower end of the cylindrical filter 18 and open central chamber 26 has a check valve 30, secured thereto, and is designed to function for the equalization of air pressure in the bottle 12 when the bottle is closed by the nozzle or valve means 22 and a lower cap 32. The check valve 30 has an inner end comprised of an elongated, cylindrical body 34 which is secured, in any desired manner, in the open central chamber 26 to seal the lower end of the filter element 18. The inner end of the cylindrical body 34 is fluidly connected to the open central chamber 26 by a passage 36, having a ball valve 38 therein. When the flexible bottle 12 is pressurized, as by squeezing the sides, water held therein will flow through the sides of the filter 18 into the central chamber 26 and out through the adapter 20 and nozzle outlet 22.

The check valve 30 includes a further or secondary filter 40 therein. This filter 40 is to maintain the integrity of the interior of the check valve 30 in a medical grade condition, and acts to block any foreign materials in the contaminated water held in the interior 28 of flexible body 12 from entering the check valve when pressure is applied to the flexible body 12 to force water through the filter 18. The filter 40 in check valve 30 may be held in the check valve in any desired manner.

The flexible body 12 also includes a bottom opening 42. This bottom opening 42 is preferably formed integrally with the body 12, in any desired manner, as by extending the bottle or bonding an exterior portion thereto. The bottom opening 42 preferably includes securing means, such as external threads 44 thereon, cooperating with internal threads 46 on bottom cap 32. Bottom cap 32 includes sealing means therein, and is screwed onto, or otherwise sealingly held on, the bottom opening 42. Water is inserted or poured into the interior of the body 12, through the bottom opening 42, and the bottom cap 32 is then secured thereon. If the body 12 is then pressurized, the water held in the body will be pressed through the micro porous, 2–8 micron filter element 18, where greater than 90% of the dead pathogen bodies, i.e., pyrogens, etc. will be blocked or filtered out.

As discussed above, in use, the combination portable bottle and filter 10 of the present invention is used to filter and purify water. In the preferred embodiment of the invention, the flexible body 12 has a tip controlled by a nozzle or valve, and the filter 18, permanently secured at the top, in the interior 28 thereof, is sized and dimensioned to produce the best possible results when secured in the top of a selected size body, no matter what the condition of the water that is poured into the body through bottom opening. For example, the filter 18 may be approximately 2–2½ inches long with a diameter of approximately 1–1½ inches, for use with a normal size squeeze bottle, known to those skilled in the art.

Accordingly, it is apparent that the present invention provides a combination squeeze bottle and permanent filter assembly held in the interior of the bottle, having considerable advantages in ease and flexibility of use, and in the efficient removal of contaminants from water inserted through a bottom opening, and which will prevent contamination of the filter which might occur in handling.

Those skilled in the art will appreciate that there are adaptations and modifications of the just-described preferred embodiments that can be configured without departing from the scope and spirit of the invention. Therefore, it is to be understood, that within the scope of the intended claims, the invention may be practiced other than is specifically described herein.

What is claimed is:

1. A portable bottle having a flexible, hollow body with an opening and a cap for inserting water into an inner chamber and a control valve for allowing water to be squeezed out of the inner chamber, comprising, in combination the flexible, hollow body having a top and a bottom with the inner chamber therebetween;

a filter assembly permanently secured to an interior surface of the top and extending partway into the inner chamber; the filter assembly including an elongated cylindrical body having an open central chamber with the open central chamber in fluid communication with the control valve;

the elongated cylindrical body having a porosity of from 2–8 microns and being fabricated from a porous, plastic material having a Powdered Activated Carbon therein so as to reduce contamination in water passing therethrough by greater than 90%;

the elongated cylindrical body including a check valve at one end of the open central chamber, away from the interior surface of the top;

the opening for inserting water is formed at the bottom, and includes external threads formed on an external surface;

the cap includes internal threads and is removably secured to the external threads of the opening for inserting water; and a sealing element is held between the cap and the opening.

2. The portable bottle of claim 1 wherein the top of the flexible, hollow body is flat with an opening containing the control valve connected to the open central chamber.

3. The portable bottle of claim 2, further including an adapter secured between the filter assembly and the flat top.

4. The portable bottle of claim 3 wherein the control valve is connected to a nipple on the adapter to control the flow of water exiting from the top of the flexible, hollow bottle, when the flexible, hollow body is squeezed to force water through the elongated, cylindrical body of the filter assembly, into the open central chamber and then into the nipple.

5. The portable bottle of claim 4 wherein the bottom opening in the flexible, hollow body extends across the entire diameter of the bottom of the flexible, hollow body.

6. The portable bottle of claim 3 wherein with the control valve opened and the flexible, hollow body pressurized, water stored in the flexible, hollow body is first pressed back through the elongated, cylindrical body of the filter assembly into the open central passageway, for passage out of the filter assembly through the control valve.

7. The portable bottle of claim 6 wherein when the cap is removed, water may be added to or removed from the inner chamber of the flexible, hollow body, through the open bottom.

8. A portable bottle having a flexible, hollow body with an inner chamber having a top with a valve control therein, and a bottom, comprising, in combination:

a filter element having an elongated, cylindrical body with an open central chamber permanently secured to an interior surface of the top, and extending into the inner chamber;

the bottom having an opening formed thereon extending entirely across a diameter of the bottom;

the cap having internal threads, which are secured onto external threads of the flexible, hollow body to close the opening in the bottom; and an adapter permanently secured to the filter element, said adapter having a top portion that passes through an aperture in the top of the flexible hollow body and said open central chamber of said filter element is in flow communication with the valve control through said adapter.

9. The portable bottle of claim 8 wherein the external threads extend around the bottom and surround the opening.

10. The portable bottle of claim 9 wherein the cap includes a sealing element held therein, which cooperates with a lip of the opening, to seal the bottom.

11. A portable bottle having a flexible, hollow, elongated body with an inner chamber having an opening and a closure cap for inserting water into the inner chamber, and a control valve for allowing water to be squeezed out of the inner chamber, comprising, in combination:

the flexible, hollow, elongated body having a substantially closed top and an open bottom in fluid communication with the inner chamber;

a filter assembly permanently secured to an interior, lower surface of the substantially closed top; the filter assembly including an elongated, cylindrical body having an open central chamber, which is in fluid communication with an aperture formed passing through the substantially closed top and connected to the control valve;

the open bottom being substantially the same size as the flexible, hollow body;

external threads formed on an exterior surface of the flexible, hollow body around the open bottom and internal threads formed on an internal surface of the closure cap for securing the closure cap to the open bottom;

a sealing element held in the closure cap for sealing the open bottom; and a check valve held in one end of the open central chamber in the elongated, cylindrical body of the filter assembly.

12. The portable bottle of claim 11, further including an adapter permanently secured to the filter assembly at the top of the flexible, hollow, elongated body.

* * * * *